United States Patent [19]

Suchanek

[11] Patent Number: 5,045,187
[45] Date of Patent: Sep. 3, 1991

[54] REGENERATION SYSTEM FOR WATER CONDITIONERS SUCH AS WATER SOFTENERS

[75] Inventor: Steven C. Suchanek, Monona, Wis.
[73] Assignee: Essef Corporation, Chardon, Ohio
[21] Appl. No.: 428,603
[22] Filed: Oct. 30, 1989
[51] Int. Cl.⁵ ............................................. B01D 17/12
[52] U.S. Cl. .................................. 210/91; 137/599.1; 210/98; 210/40; 210/141; 210/143; 210/191; 210/278
[58] Field of Search ................. 137/599.1; 210/89, 91, 210/98, 140, 142, 143, 190, 191, 269, 278, 284, 141

[56] References Cited
U.S. PATENT DOCUMENTS
4,921,598 5/1990 Desch .............................. 137/599.1

Primary Examiner—Ivars Cintins
Attorney, Agent, or Firm—Pearne, Gordon McCoy & Granger

[57] ABSTRACT

A regenerating control system for liquid conditioners includes ball valves positioned and sized so that they do not cause any flow restriction during the normal operation of the conditioner. The valves are operated by low voltage D.C. motors which require power only while moving the valves from one position to another position. An electronics control system and timer control the operation of the valves and require very small amounts of power. Consequently, a battery backup system can operate for extended periods of time when a commercial power outage occurs. A two-piece housing assembly provides improved seals for sealing between the two housing halves and between the housing assembly and the valve.

18 Claims, 8 Drawing Sheets

REGENERATION SYSTEM FOR WATER CONDITIONERS SUCH AS WATER SOFTENERS

BACKGROUND OF THE INVENTION

This invention relates generally to a control for a regeneration system of a water conditioning system, and more particularly to a novel and improved automated valve system particularly suited for regenerating water conditioning systems such as water softeners and the like.

PRIOR ART

Water softeners often provide a tank containing an ionic exchange resin which must be regenerated from time to time so that it can continue to function. During such regeneration cycles, it is customary to first conduct a backflush or backwash operation to cleanse the resin bed and then introduce brine into the resin bed for regeneration of the resin. Thereafter, a fast rinse is normally provided to wash the brine from the resin and the system is then returned to normal service.

Typically, in automated regeneration systems, a valve network is provided to sequentially perform each of these operations. Further, it is typical to use spool valves or plunger valves in the network which impose a substantial flow restriction and therefore cause a substantial pressure drop in the system when high flow rates are required.

In many systems, it is known to provide a motor-driven timer which functions through cams to operate the various valves and to time both the period between regeneration cycles and also the duration of each phase of the regeneration cycle. Since the motors of such timers have a substantial and constant power requirement, such systems are not provided with a backup power source and interruptions in the electrical power supplied to the regeneration system affect the timing when the cycle is performed and also can affect the timing of the various phases of the actual regeneration cycle.

It is also known to provide solenoid-operated valves in regeneration systems. Such valves require a constant current flow to maintain the valve actuated and, therefore, are generally unsatisfactory for use in systems providing a battery backup power source.

The flow restriction provided by many of the prior art valve systems, such as spool valve systems, is particularly objectionable in commercial installations, which often require very substantial flows. Further, when a constant source of power is required for reliable operation, excessive standby power requirements tend to prohibit the use of standby battery power for reliable operation.

SUMMARY OF THE INVENTION

There are a number of important aspects of the present invention. In accordance with one important aspect, a novel and improved valve system is provided for liquid conditioning systems, such as water softeners or the like, which does not produce a significant pressure drop even when high flow rates occur.

The illustrated embodiment provides four ball valves sized and interconnected to provide a completely unrestricted flow when the unit is in normal service. The four ball valves are interconnected for straight-through flow when the conditioner is in normal service. Therefore, the flow is completely unrestricted by the valves when the unit is in normal service operation. Further, the valves are mounted in a housing which provides flow passages arranged to minimize the number of turns, and therefore minimize the number of restrictions to flow.

In accordance with another aspect of this invention, a novel and improved valve system for liquid conditioning systems is provided in which the valves are actuated by electric motors which require power only during the actual movement of the valves between their various operating positions. Further, the electronic control circuit for sequencing the valves for the regenerating cycle requires very low current drain. Consequently, the system can function for extended periods of time on battery backup power without requiring substantial battery capacity. Also, the electronic control circuit itself requires only low voltage direct current, making operation in a wet environment and operation in foreign countries simpler.

In accordance with another aspect of this invention, the electronic control circuit provides indication of failure of the valves to operate. Additionally, reconditioning cycles may be initiated by real-time clock, liquid use, or the availability of an alternate conditioner.

In accordance with another aspect of this invention, a novel and improved seal system is provided for the valves and the housing. Such seal system includes a sealed assembly for each ball valve having a seal ring engaging the valve element which is formed to mate fully with the ball valve and which does not allow for the accumulation of debris, which can cause leakage or wear. Therefore, each valve functions reliably for extended periods and through repeated cycles of operation with little or no maintenance.

Further, the valve housing is formed from two mating housing halves which cooperate to define the valve housing and the flow passages. Here again, novel and improved seals are provided to interconnect the housing halves and also seal the valves within the housing assembly.

In order to prevent corrosion, and to minimize machining costs, the system is formed of noncorrosive, molded plastic components. Further, the housing is structured so that only three connections are required to connect the entire conditioning system to the water system.

Still further, the housing is structured for mounting on the resin tank in a manner which permits the control system to be disconnected from the resin tank without disturbiing the piping system connecting the housing to the water system.

These and other aspects of this invention are illustrated in the accompanying drawings, and are more fully described in the following specification.

DETAILED DESCRIPTION OF THE DRAWINGS

Figure 1:
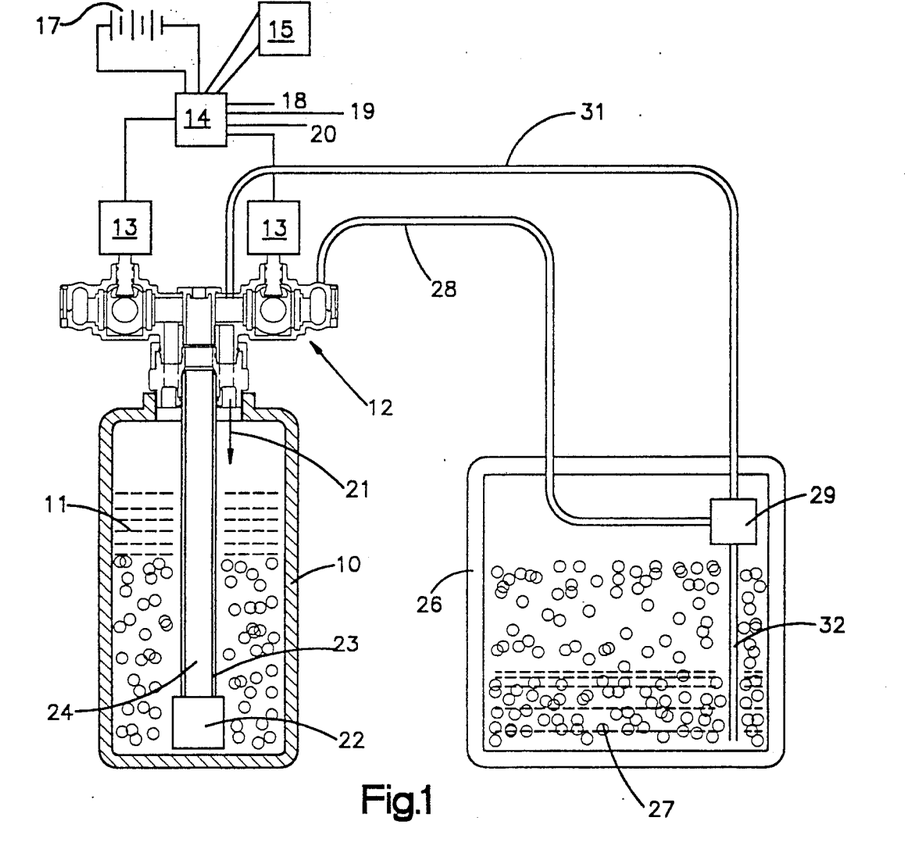
FIG. 1 is a schematic illustration of a water softener system incorporating the present invention.

FIG. 1 schematically illustrates a typical water softening conditioning system incorporating the present invention. The particular illustrated embodiment may be used, for example, in commercial installations where substantial flow rates are required, and provides a system where a minimum pressure drop occurs even at high flow rates. In some such systems, two or more conditioning systems may be provided which work in parallel and are interconnected so that only one system is placed in a regenerating cycle at a time. When combined in such a manner, the total system provides an uninterrupted supply of conditioned water since one conditioner functions to continue to supply conditioned water while the other conditioner is being regenerated. The illustrated conditioning system can also be used as a stand-alone system in which a bypass is provided to continue to supply water, although untreated, during the regeneration cycles.

The illustrated conditioning system is described in connection with a water softener utilizing an ion exchange resin well known to persons skilled in the art which is regenerated at intervals by brine. It should be understood, however, that within its broader aspects the present invention can be applied to other types of liquid conditioning systems such as industrial liquid treatment systems, swimming pool filtering systems, and the like.

The illustrated system includes a closed vessel or tank 10 containing a bed of resin 11 which operates to condition liquid flowing through the tank between regeneration cycles. Mounted on the upper end of the tank 10 is a control system 12 through which liquid (water in the instance of a water softener) is supplied to the tank 10. The control system 12 provides a plurality of valves, discussed in detail below, which are operated to automatically establish a regenerating cycle for regenerating the resin bed 11.

The valves are operated by an electric motor 13 associated with each of the valves to sequence the system through a regenerating cycle in response to signals produced by a control circuit, schematically illustrated at 14.

In accordance with the preferred embodiment of the present invention, the control circuit 14 is normally powered by a low voltage direct current source 15 (e.g., 12-volt power supply that mounts directly onto a commercial 110-volt A.C. power receptacle for both power and mechanical attachment), as are the electric motors 13. Further, a standby source of electrical power is provided by a battery, schematically illustrated at 17, to ensure continued proper operation of the overall system in the event of a power failure. In accordance with the present invention, the electrical power requirements for the operation of the total system are minimized so that a relatively small source of standby power, i.e., a relatively small 12-volt battery, can function to continue the operation of the system in a reliable manner even if power outages continue for a relatively long period of time. Because only low voltage D.C. is required to power the conditioner, operation in countries with different A.C. commercial power requires only changing the D.C. source 15. Operating in a potentially wet environment is also made easier by the use of low voltage.

The control circuit 14 is provided with a time-of-day and day-of-week clock input 18, a water meter input 19, and a lockout input 20. Initiation of a reconditioning cycle is begun by combination of inputs 18, 19, 20. The clock input 18 is intended to be connected to a real-time clock (not shown) that periodically permits a reconditioning cycle (e.g., 2-6 a.m. on Saturdays). The water meter input 19 is intended to be connected to a water meter (not shown) that signals when a given quantity of water has been used (e.g., 10,000 gallons), and therefore a reconditioning cycle is needed. The lockout input 20 is intended to be connected to an alternate liquid conditioner (not shown) that would provide a signal indicating that the alternate liquid conditioner was in a reconditioning cycle and as a result "lock-out" the initiation of a reconditioning cycle in the present invention until the alternate was in service mode. If any of the inputs 18, 19, 20 were not desired, they could be connected to the proper fixed voltage in a manner within the knowledge of one skilled in the art.

The control circuit 14 may, for example, be made up of a microprocessor, electronic memory, display means, input means, a program, and solid state drivers as would be within the capabilities of one skilled in the digital electronics art. Control circuit 14 controls operation of the conditioner by the sequencing of motors 13, which in turn operate valves 12. Control circuit 14 drives valves 12 into the position required for each cycle of the conditioner and determines how long each valve 12 remains in a given position according to the circuits contained therein.

In normal operation between regenerating cycles, liquid enters the tank 10 from the control system 12 at the upper end of the tank, as indicated by the arrow 21. Such liquid passes down through the bed resin 11 into a manifold, schematically illustrated at 22, at the lower end of the tank. Such manifold is constructed so that liquid can enter the manifold, but the surrounding material of the filter bed or resin bed 11 cannot. During normal conditioning operation of the system, the liquid then flows up along the conduit 23, as indicated by the arrow 24, to the control system 12, which delivers the conditioned (softened water in the illustrated embodiment) to the distribution system serviced by the conditioner.

The conditioner also includes a brine tank 26 containing liquid brine 27 for the regeneration of the resin 11 during the regeneration cycle. During the regeneration cycle, the control system 12 initially performs a backflush or backwash operation in which untreated water is delivered down through the conduit 23 and passes out through the manifold into the resin bed 11. Such water then passes up through the resin bed and passes out of the system to a drain. Such backwash or backflush operation operates to clean the resin bed, but does not actually regenerate the resin itself.

After the backflush or backwash phase of the regeneration cycle, a second phase of operation occurs in which brine 27 from the brine tank 26 is delivered to the top of the tank 10 and passes down through the resin bed to regenerate the resin bed 11. During such operation, the brine enters the manifold 22 and passes up the conduit 23 to the control system 12 and is discharged through a drain. As discussed below, the illustrated embodiment is structured so that a reverse direction brine flow can be provided.

In order to transfer the brine from the brine tank 26 to the tank 10 during the regenerating cycle, water is delivered from the control system 12 through a pipe or conduit 28 to a venturi 29 and then passes back through a second conduit or pipe 31. The action of the venturi 29 causes the brine to be drawn up along a pipe 32 to the venturi and to be delivered to the control system 12 through the pipe 31.

The illustrated embodiment also provides for a fast rinse at the end of the brine cycle, during which the control system 12 operates to introduce untreated water from the supply down through the resin bed and to then deliver the flush water to a drain.

This basic regenerating cycle is known in the prior art, and is set forth only to provide background for the present invention.

Figure 2:
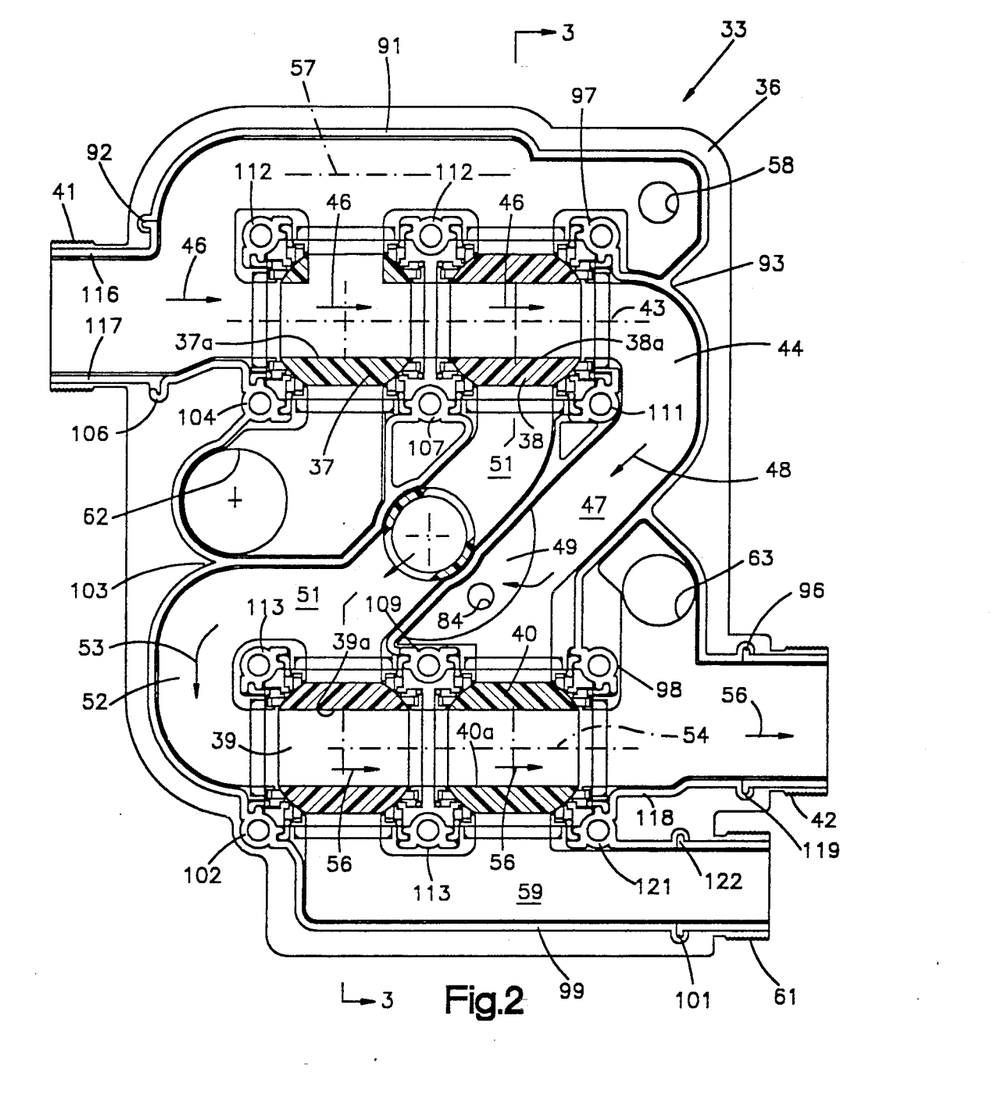
FIG. 2 is a plan view of the housing and valve system, with the upper housing half removed, illustrating the valves in their normal in-service position.
Figure 2A:
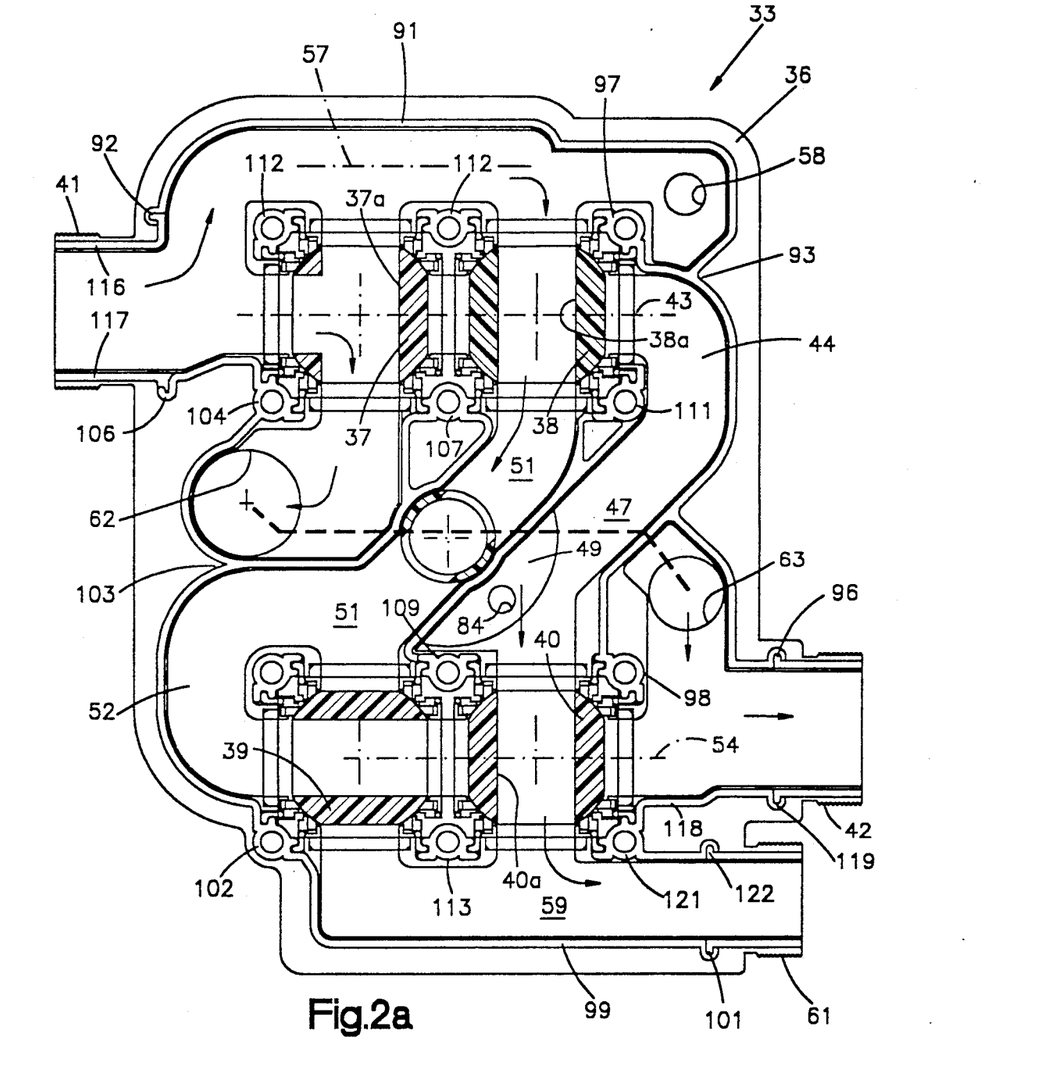
FIG. 2a is a view similar to FIG. 2, but illustrating the valves in the position for backwash.
Figure 2B:
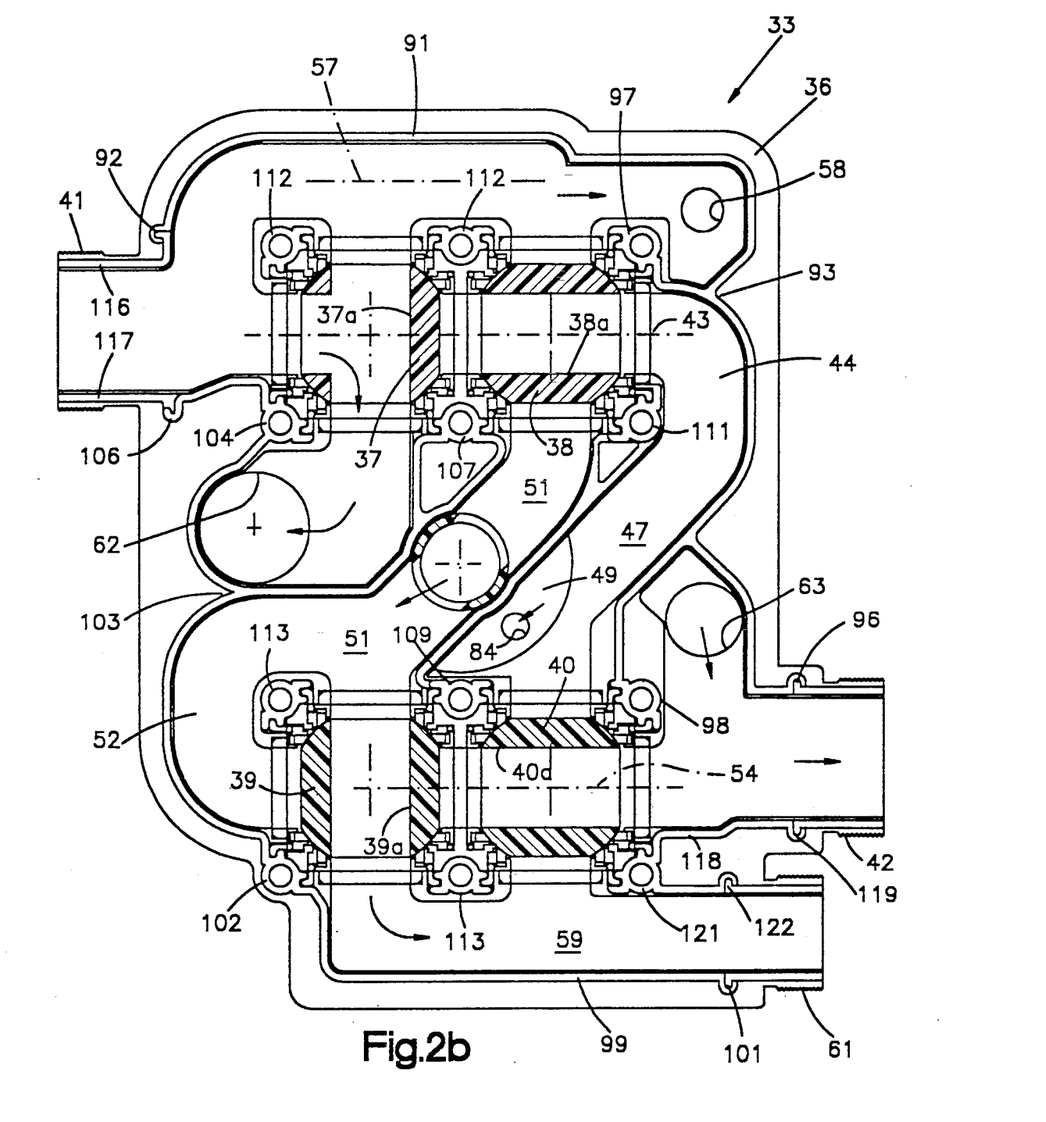
FIG. 2b is a view similar to FIGS. 2 and 2a, but illustrating the valves in the position for regeneration in which a slow brine rinse is provided.
Figure 2C:
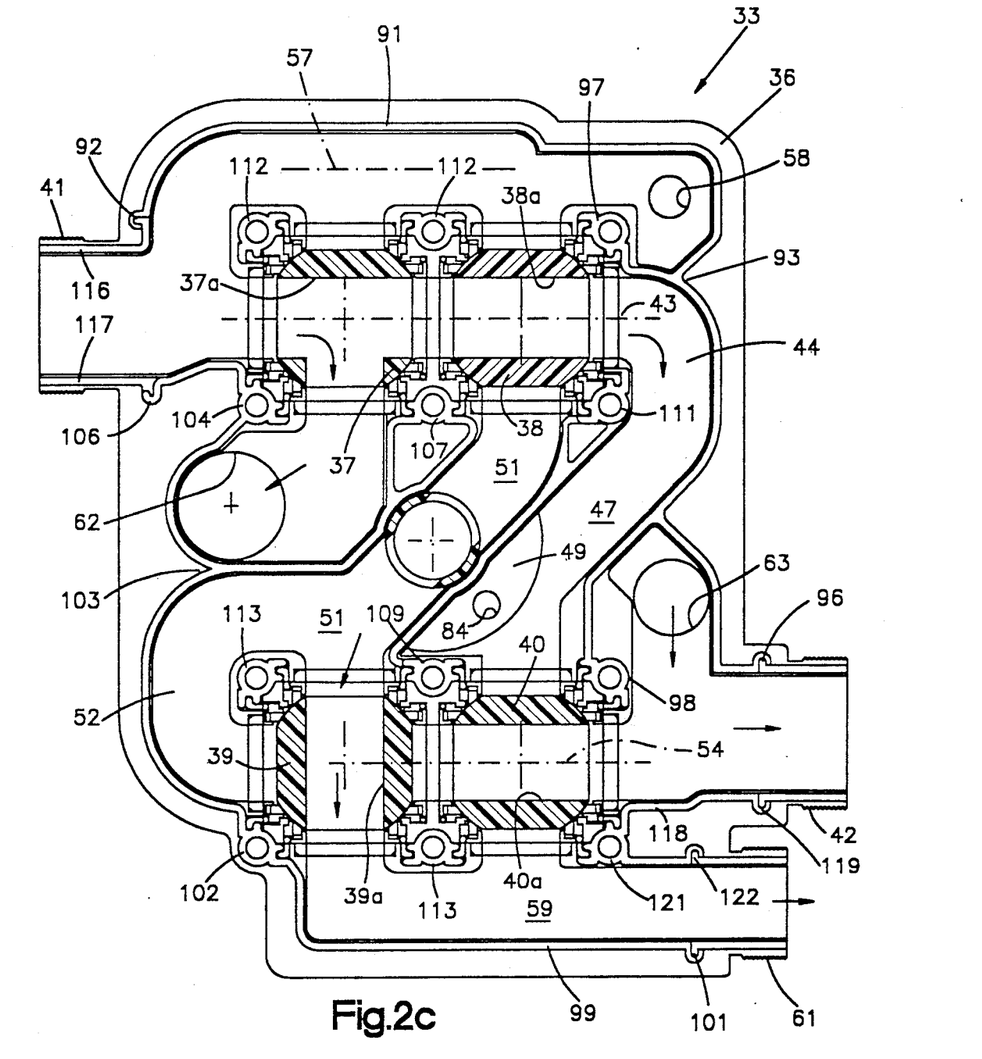
FIG. 2c is a view similar to FIGS. 2 through 2b, but illustrating the valves in the position for a fast rinse, which is the last phase of the regenerating cycle prior to returning the system to normal service.
Figure 3:
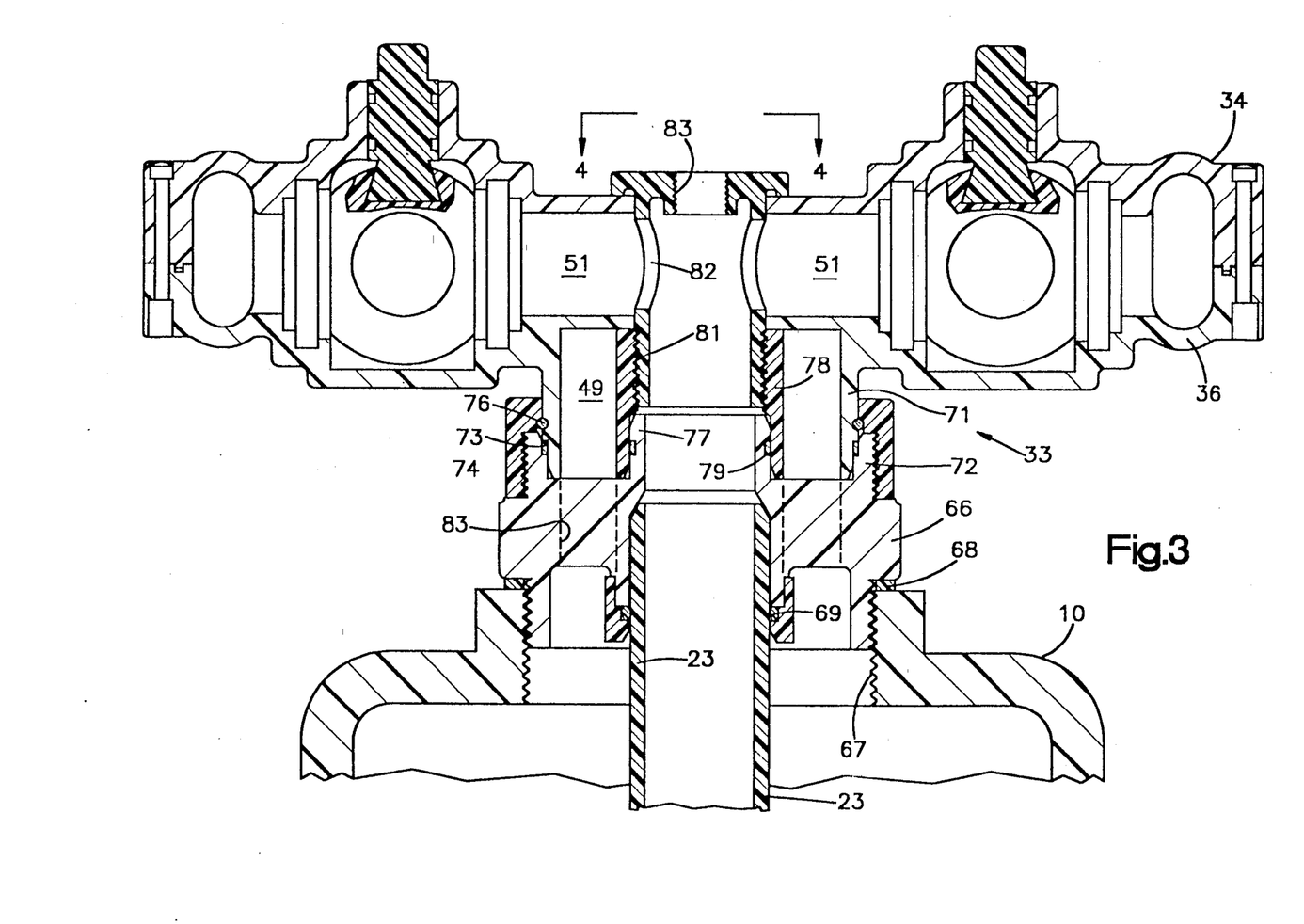
FIG. 3 is a staggered, vertical section illustrating the structure for mounting the control valve housing on the resin tank of the softener.

Reference should now be made to FIGS. 2 through 2c and 3, which illustrate the structural detail of the control system 12. The control system 12 includes a housing assembly 33 defined primarily by upper and lower housing halves 34 and 36, which cooperate to define a passage network, best illustrated in FIGS. 2 through 2c. Also located within the housing are four ball valves 37, 38, 39, and 40.

In FIG. 2, the valves 37 through 40 are illustrated in position for normal conditioning operations in which untreated water enters the housing through an inlet 41 and is discharged from the housing through an outlet 42. In operation, the inlet 41 is connected to a source of untreated water and the outlet 42 is connected to the distribution system supplied with the treated water by the conditioning system.

The housing is structured and the valves are positioned so that water entering the inlet 41 passes straight through the first two valves 37 and 38 along a straight flow path 43 extending from the inlet 41 to a bend or corner 44 in the passage network. Such straight flow path through the valves 37 and 38 is indicated by the arrows 46 and the centerline of the flow path 43. From the bend 44, the incoming water passes along a passage portion 47, as indicated by the arrows 48, through a downwardly extending passage 49 into the upper end of the tank 10.

After passing through the resin bed 11, as discussed above, the conditioned water flows up along the conduit 23, illustrated in FIG. 3, into a passage portion 51. The passage portion 51 is connected at one end ot a second passage bend 52 around which the conditioned water flows, as indicated by the arrows 53, to a second straight flow path 54, indicated by its centerline. This second straight flow path 54 is aligned with the outlet 42 and contains the third and fourth ball valves 39 and 40.

The openings 37a, 38a, 39a, and 40a, respectively formed in the ball valves 37 through 40, are aligned with the associated straight flow paths 43 and 54. Therefore, the flow through each of the valves is not deflected in any way by the presence of the valves during the normal operation of the conditioner. Further, such openings 37a through 40a are sized to provide substantially the same cross-sectional area as the adjacent passage portions. Consequently, the valves 37, 38, 39, and 40 do not themselves produce any flow restriction during the normal conditioning operation of the system. Consequently, the control system 12 operates in normal service without producing any material pressure drop, even when high flow rates are provided through the system.

The housing assembly 33 also defines a passage portion 57, indicated by its centerline, which extends parallel to the flow path 43 but is laterally offset therefrom. This passage portion is connected to the inlet 41 at one end and the sides of the valves 37 and 38 intermediate its ends.

The housing assembly also provides a passage portion 59 laterally offset from and substantially parallel to the flow path 54. This passage portion 59 connects with the two valves 39 and 40 and also with a drain outlet 61.

In order to permit the system to be used without a second similar system which continues to condition the water during the regenerating cycle, the housing assembly 33 provides a port 62 in communication with the valve 37 and a port 63 in communication with the outlet 42. The ports 62 and 63 are located in the upper housing half 34 and are shown in phantom in FIGS. 2, 2a, 2b, and 2c. When the conditioning system is used as a stand-alone system without a parallel conditioner, external piping is connected between the ports 62 and 63 to provide a bypass during the regeneration cycle, as discussed in greater detail below. On the other hand, when two parallel conditioning systems are provided so that one conditioning system continues to condition the water while the other is regenerating, such ports are plugged and a bypass is not provided. A port 58 is provided near the outlet 42. The port 58 may provide the connection for the pipe 28 (illustrated in FIG. 1) to the control system 12. Because, in operation, the outlet 42 is connected to conditioned water from the flow path 54, bypass water from the port 63 or water from a parallel conditioner, the port 58 is always supplied with a water source.

Referring specifically to FIG. 3, the housing assembly 33 is removably mounted on the tank 10 with an adapter 66 which is threaded into a threaded opening 67 in the tank 10. A seal 68 provides a fluidtight joint between the tank and the adapter. The conduit 23 which supports the manifold 22 at its lower end (see FIG. 1) extends up into the adapter 66 through a seal 69, which provides a fluidtight joint between the conduit 23 and the adapter 66.

The lower housing half 36 provides a cylindrical skirt 71 which fits with a mating skirt 72 on the adapter 66 around a seal 73, which provides a fluidtight joint between the two skirts 71 and 72. The two skirts are releasably held in the assembled position by a ring nut 74 which threads onto the exterior surface of the skirt 72 and engages a key ring 76 positioned within a groove on the skirt 71.

Figures 4, 6B:
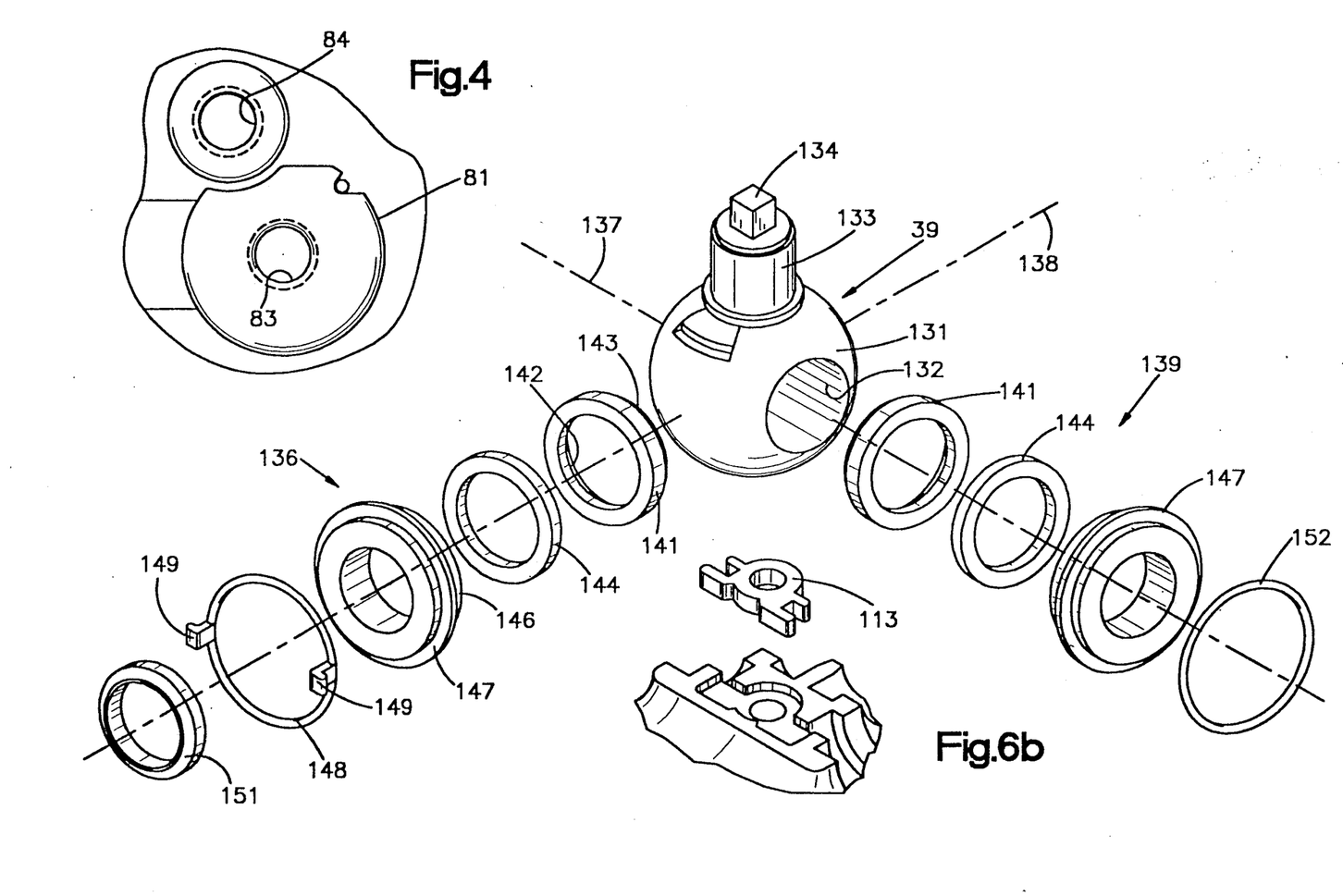
FIG. 4 is a fragmentary view taken along line 4—4 of FIG. 3.
FIG. 6b is an exploded view of two of the four seal assemblies for each of the valves.

The central portion of the adapter member 66 provides a central skirt 77 which extends up into a tube 78 through a seal 79 which provides a fluidtight joint therebetween. The skirt 77 is aligned with the conduit 23 and defines a continuation of the passage of such conduit. A tubular stem 81 extends down through an opening in the upper housing half 34 through the passage portion 51 and an opening in the lower housing half 36. The tubular stem 81 is provided with lateral parts 82 which interconnect the ends of the passage portion 51 with the passage in the conduit 23. The end of the tubular stem 81 is threaded into the other end of the tube 78. The upper end of the stem 81 is shown in FIG. 4. With this structure, the interior of the conduit 23 is in fluid communication with the passage portion 51. The passage portion 47 communicates with the upper end of the tank 10 around the conduit 23 through the vertically extending passage 49 and aligned passageways 83 formed in the adapter 66.

In the event that it becomes necessary to disconnect the housing assembly 33 from the tank, it is merely necessary to rotate the ring nut relative to the adapter member to release the threaded connection between them and separate the housing assembly from the adapter and tank. With such structure, it is not necessary to produce rotation of the tank relative to the housing, or vice versa. Consequently, it is normally not necessary to remove the piping connecting the housing assembly to the water system being serviced when the housing assembly and tank are disconnected.

The lower housing half 36 is provided with a threaded port 83 communicating with the passage portion 51 and a second threaded port 84 communicating with the passage portion 47. If the brine wash phase of the regenerating cycle is to be arranged so that the brine enters the top of the tank and flows down through the resin bed to the manifold 22, the conduit or pipe 31 (illustrated in FIG. 1) is connected to the port 84. In such instance, a plug is inserted in the port 83. The provision of the port 83, however, permits a possible alternative operation in which the brine wash phase of the regenerating cycle is conducted so that the brine enters the tank through the manifold, rather than at the top of the tank, and flows up through the resin. In such event, the valve sequence must be altered from the illustrated sequence.

Figure 5:
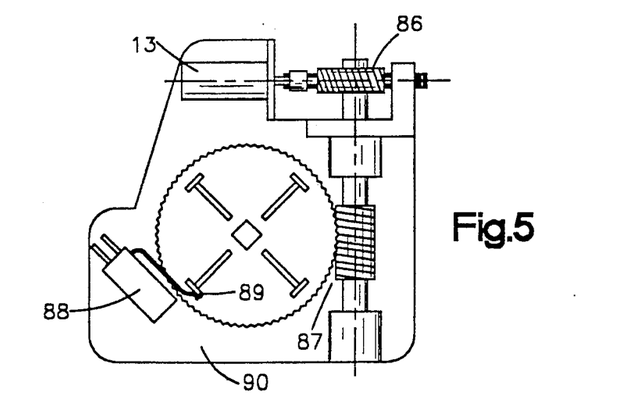
FIG. 5 schematically illustrates one of the motor drives which is associated with each valve to power the valves through the regenerating cycle.

FIG. 5 illustrates the actuator 85 for the valve 39. It should be understood that a similar type of actuator 85 is provided for each of the valves. The actuator 85 includes an electric motor 13 connected through a first worm drive speed reducer 86. The output of the first worm drive speed reducer 86 powers a second worm drive speed reducer 87, providing an output worm wheel 90 connected to rotate the associated ball valve 39 through a connector described below. With this two-stage, series-connected speed reduction, the motor 13 associated with each valve can rotate at a relatively high speed and provide low speed operation of the associated valve. Further, the speed reduction connection provides torque magnification of the motor and ensures that ample power is available for the operation of the associated valve.

A microswitch 88 is operated by cam 89 on the worm wheel 90 of the worm drive 87 to generate a signal to stop the motor operation when the valve is rotated from one operative position to another. Such microswitch can also advantageously provide a signal indicating that the valve has moved to its proper operative position. The signal from the microswitch 88 is provided to the control circuit 14. Upon operation of the microswitch 88, the control circuit 14 deenergizes the motor 13 until the next operation is required. If the microswitch 88 is not operated within a fixed time (e.g., 12-15 seconds) after energizing the motor 13, the control circuit 14 indicates an error. This indication, for example, may be a light 95 on the control circuit 14 or at a remote location. This allows ready indication of a malfunction in the conditioner. As discussed below, the valve 37 is rotated through three positions during the regenerating cycle, but the valves 38 through 40 are normally rotated only through 90 degrees each time they are operated. The worm wheel for the valve 37 may be provided with an additional cam and switch to provide for indexed rotation of 180 degrees.

A seal assembly is provided to seal the joint between the upper and lower housing halves 34 and 36, and also to seal between the housing assembly and the respective valves 37 through 40.

As best illustrated in FIGS. 2 through 2c, the seal assembly for sealing between the two housing halves includes a first molded seal member 91 shaped to fit in grooves formed at the interface between the two housing members and extending from the location 92 along the upper periphery of the joint between the housings, as illustrated in FIG. 2, around the passage portion 57 to the location 93. From such locations, the seal also extends along the periphery of the passage portion 47 to a location 94, and therefrom, past the port 63 to the location 96. In addition, a branch of the seal 91 extends from the location 93 to an end at 97 and from the location 94 to an end at 98.

A second seal member 99 extends along mating grooves in the housing halves from the location 101 along the side of the passage portion 59 to a location 102 adjacent to the ball valve 39, and then along the bend 52 to a location 103. From the location 103, the seal member 99 extends past the port 62 to a location 104 adjacent to the ball valve 37, and therefrom to an end 106 adjacent to the inlet port 41. From the location 103, the seal 99 also provides a branch extending along the passage portion 51 to an end at 107 essentially midway between the two valves 37 and 38. A third seal member 108 extends from an end 109 between the valves 39 and 40 and along the passage portions 47 and 51 to an end at 111 adjacent to the valve 38.

In addition, two similar seal elements 112 and 113 are respectively positioned in grooves formed in the housing between the valves 37 and 38 and the valves 39 and 40, respectively. The seal assembly also includes another pair of similar seals 114 and 115 adjacent to the valves 37 and 39, respectively. In addition, two seal elements are provided at each of the inlets and outlets. At the inlet 41, a pair of seal members 116 and 117, respectively, extend from the end of the inlet 41 along the opposite sides thereof to the ends of the seals 91 and 99 at the locations 92 and 106. At the junction between the seal 91 and 116, the end of the seal 91 is provided with a generally hook-shaped end which interfits with a lateral projection on the end of the seal 116 to ensure a fluidtight connection therebetween, as best illustrated in FIG. 2. Similarly, the junction at the location 106 between the seal 99 and the seal 117 provides a hook and projection connection for proper sealing.

Another molded seal 118 extends along one side of the flow path 54 from a location 119 to a location 121 and back along the inner side of the passage portion 59 to the location 122. Two seals 123 and 124 extend along opposite sides of the outlet opening 42 and provide a hook and projection interconnection with the ends of the seals 91 and 118 at the locations 96 and 119, respectively.

A pair of similar seals 126 and 127 extend along opposite sides of the drain opening 61 to the locations 122 and 101, respectively, where a hook end projection connection is provided with the seals 118 and 99, respectively. All of these seals cooperate with the two housing halves to provide a fluidtight joint therebetween and to separate the various flow paths and passage portions. When the two housing halves 34 and 36 are bolted together by bolts (not illustrated), the various seals are compressed between the two housing halves and function to provide the necessary seals therebetween. By providing a hook and projection interface between the various seals, it is not necessary to produce continuous seals along any particular portion and the seal assembly is assembled from individual seal elements.

Figure 6:
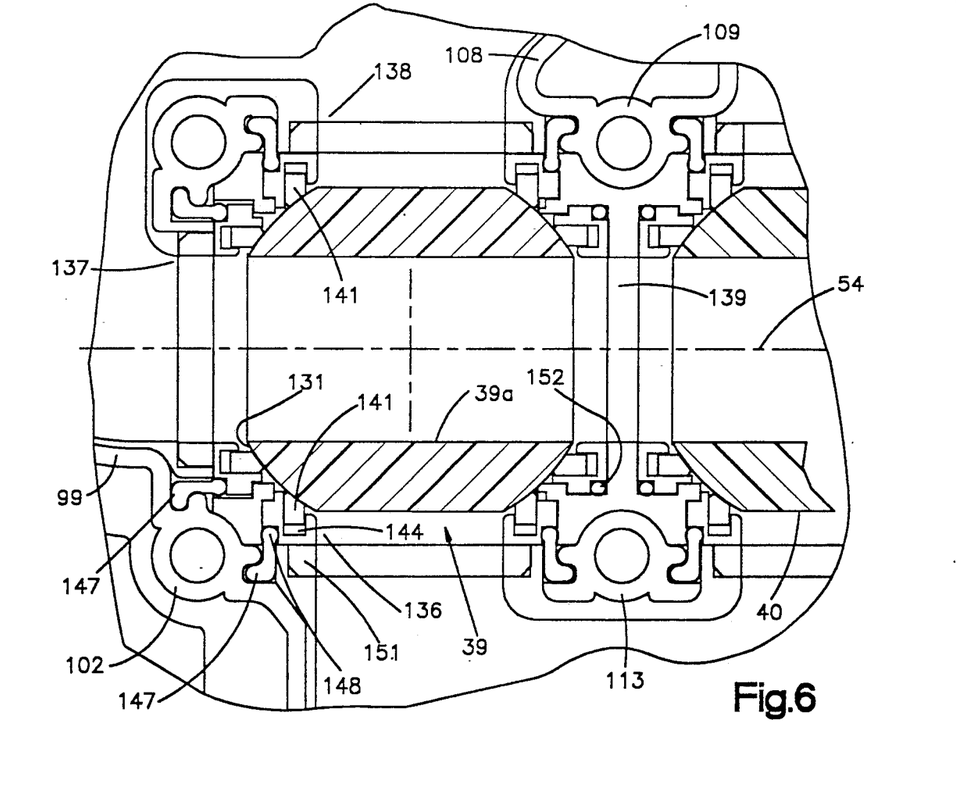
FIG. 6 is an enlarged, fragmentary view of one of the control valves illustrating the seals associated therewith.
Figure 6A:
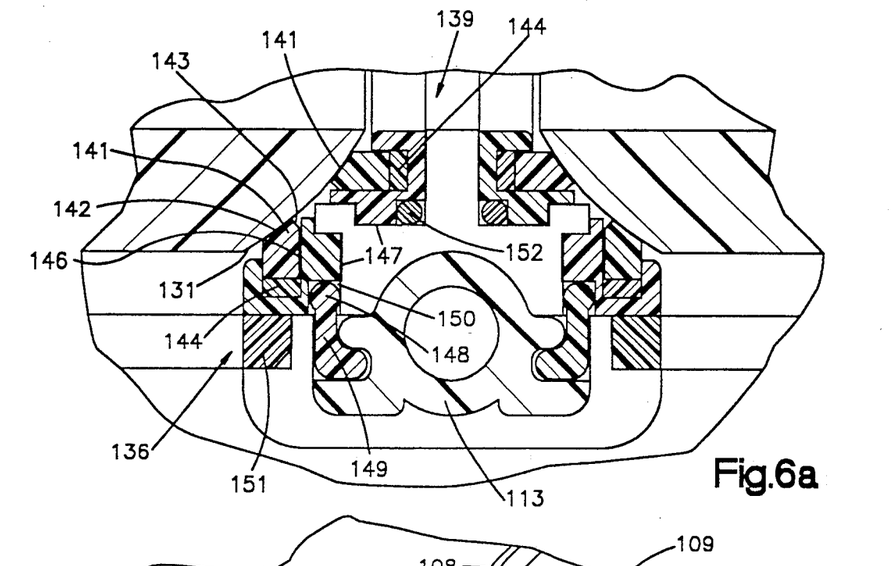
FIG. 6a is a further enlarged, fragmentary view of the seals in the portion designated A in FIG. 6.

FIGS. 6, 6a, and 6b illustrate a seal system directly associated with the valves 37 through 40. Since the seal systems involved with each valve are identical, only the seal system associated with the valve 39 is discussed in detail, with the understanding that this description applies to all of the valves.

The ball valve 39 includes a spherical valve element 131 having a lateral passage 39a therethrough. Connected to the valve element 131 is a driver 133 (illustrated in FIG. 6b) providing a rectangular stud 134 which fits into the worm wheel 90, illustrated in FIG. 5, to connect the drive to the valve element 131 for rotation thereof. Positioned around the valve element 131 ninety degrees apart are four seal assemblies 136 through 139. The seal assemblies 136, 137, and 138 are identical, so only one is illustrated in FIGS. 6a and 6b. The seal assembly 139 differs from the other seal assemblies in one minor respect, and is therefore separately illustrated in FIGS. 6a and 6b.

Each of the seal assemblies 136 through 138 includes a seal ring 141 having a forward face 142 which is a portion of a sphere having the same diameter as the spherical valve element 131. The forward face 142 mates with the spherical surface of the spherical valve element 131 and provides a fluidtight joint therewith. Preferably, the seal ring is formed of Teflon or the like, which is wear-resistant and capable of establishing a reliable, dynamic seal with the surface of the valve element, and which does not wear during extended use. The outer edge of the forward face is chamfered at 143 to eliminate a weak, thin section at the periphery of the forward face. With this structure, which provides full mating contact with the valve element 131, debris does not tend to collect which could cause wear during the life of the valve.

Positioned immediately behind the ring seal 141 is a resilient ring 144 which resiliently urges the ring seal into sealing engagement with the valve element 131. The resilient ring 144 is positioned within its annular groove 146 in a seal holder 147. The rearward end of the ring seal 141 also projects into the annular groove 146 and is positioned and supported by the seal holder 147.

Positioned immediately to the rear of the seal holder 147 is an O-ring like seal 148 which, however, is formed with diametrically opposed, L-shaped projections 149. The annular or circular ring portion of the seals 148 mates in a step groove 150 formed in the seal holder 147 and the L-shaped projections extend into mating, hook-like recesses formed in the seal 113 and in the seal 99 at the location 102. These L-shaped projections ensure that a fluidtight connection is made between the seals 148 and the adjacent portion of the seals between the two housing halves. A backup ring 151 is positioned within the housing and presses the seal 148 into tight sealing engagement with the seal holder and provides for the location of the entire seal assembly in a direction toward the valve element 131.

The seal assembly 139 provides a seal ring 141, a resilient ring 144, and a seal holder 147 identical with the corresponding elements in the other seal assembly. However, in this seal assembly 139, a simple O-ring 152 is positioned along the rearward side of the seal holder 147 to provide a seal between such assembly and the housing halves. Since the seal 113 and the end 149 of the seal 148 bridge between the two valves 39 and 40, it is not necessary to provide a seal 148 of the type having the L-shaped projections.

Referring again to FIGS. 2 through 2c, FIG. 2 illustrates the valve in the position for normal service operation of the conditioner. Untreated water from the water supply system enters the housing 33 through the inlet 41 and passes without restriction through the two valves 37 and 38, with a straight-line flow path. The passages formed in all of the ball valves are sized with a cross-sectional area substantially equal to the cross-sectional area of the entire flow system, so the straight-line flow path through the valves 37 and 38 does not create any flow restriction even at high flow rates.

In the position of FIG. 2, the valve 37 isolates the port 62 so bypass flow cannot occur even if a bypass connection is provided between the two ports 62 and 63. The valve 38 also isolates the passage portion 51 from the incoming flow, so all of the incoming flow passes along the passage portion 47 and down into the upper end of the tank through the passage 49. This causes the supply water to pass through the resin bed 11, which conditions the water. The conditioned water subsequently flows into the manifold 22 and up the conduit 23 into the passage portion 51. The flow of the treated or conditioned water then continues around the bend 52 and through the two valves 39 and 40 with straightline, unrestricted flow to the outlet 42. During this phase of the operation, the valves 39 and 40 isolate the passage 59 and the valve 40 also isolates the flow path 54 from the passage portion 47. Because the two sides of the venturi 29 are at the same pressure, no brine is introduced into the system.

FIG. 2a illustrates the valve positions during the backwash phase of the regenerating cycle. In such position, the valve 37 has rotated 90 degrees in an anticlockwise direction from its position illustrated in FIG. 2. Similarly, the valves 38 and 40 are rotated through 90 degrees, but the valve 39 remains in its former position. During this phase of the regenerating cycle, untreated water enters the housing through the inlet 41 and may flow to the port 62 if a bypass is provided. From the port 62 external piping carries the bypass water to the port 63 from which the untreated water is delivered to the outlet 42. If a parallel system is provided including two conditioners, such a bypass connection is not provided and the conditioner which is not regenerating continues to supply conditioned water to the connected system.

The incoming untreated water also flows through the passage portion 57 and through the valve 38 to the passage portion 51. However, since the valve 40 has been moved, the incoming water cannot reach the outlet and must pass down through the conduit 23 and out the manifold 22 to the bottom of the tank. Such backwash water then flows up through the resin bed and up the vertically extending passage 49 into the passage portion 47. Such water is then discharged through the valve 40 to the drain outlet 61.

At the completion of the backwash phase of the regenerating cycle, the valves are again operated by the control system to a position illustrated in FIG. 2b for the brine rinse phase of the regeneration cycle. During such phase of the regenerating cycle, the supply of untreated water entering the inlet 41 continues to be connected to the port 62 for bypass operation if the ports 62 and 63 are externally connected. The valves 37 and 38 prevent any direct connection between the supply and either the passage portion 51 or the passage 49. The manifold 22 at the bottom of the tank is connected through the conduit 23 to the passage portion 51, which is in turn connected through the valve 39 to the drain 61.

During this phase of the regenerating cycle, the supply pressure is connected to the port 58 and the pipe 28 to the venturi 22. Consequently, brine 27 is drawn up through the pipe 32 and is delivered through the pipe 31 to the port 84 into the passage portion 47. From the passage portion 47 the brine enters the top of the tank and is carried down through the resin bed 11 and is exhausted to the drain 61.

At the completion of the brine rinse phase of the regenerating cycle, the valves are operated by the control circuit to the positions of FIG. 2c to provide the fast rinse. In the valve positions of FIG. 2c, the bypass port 62 is again connected to the source of untreated water from the inlet 41 through the valve 37. However, the untreated water is also supplied to the top of the tank through the valves 37 and 38 which connect the inlet port to the passage portion 47. The two valves 39 and 40 isolate the rinse water flowing up through the manifold 22 from the outlet 42, but allow flow from the manifold to pass out through the drain 61.

At the completion of the fast rinse, the valves are again operated to return them to the position of FIG. 2 to return the conditioner to normal service operation.

A conditioner in accordance with the present invention provides a valve system which does not introduce any material pressure drop, even at high flow rates, and which can be operated for extended periods of time with battery backup power because the electrical drain on such a backup power source is minimized. The only power requirement for the operation of the valves occurs during the actual movement of the valves. Further, the timing and control circuit is selected for low power requirements. Additionally, an improved seal structure is provided to ensure reliable operation of the ball valves, with a minimum of maintenance even when the system is operated for an extended period of time. Since all of the parts contacted by the liquid being conditioned or treated are formed of molded plastic, a minimum amount of machining is required and corrosion problems are non-existent.

Although the preferred embodiment of this invention has been shown and described, it should be understood that various modifications and rearrangements of the parts may be resorted to without departing from the scope of the invention as disclosed and claimed herein.

What is claimed is:

1. A control system for liquid conditioners having a container of treatment material which must be periodically subjected to a reconditioning cycle and which operates to condition said liquid in a service mode between said reconditioning cycles, comprising a housing having an inlet port and an outlet port, said housing defining between said ports a flow path, said flow path providing
    (a) a first substantially straight portion,
    (b) a second substantially straight portion,
    (c) a third portion connecting said first and second portions, said third portion providing a connection with said container intermediate its ends,
first ball valve means including two ball valves in said first portion, second ball valve means including two ball valves in said second portion, actuator means connected to operate said valves, said first valve means being aligned with said first portion and providing unrestricted flow therethrough when in said service mode, said second valve means being aligned with said second portion and providing substantially unrestricted flow therethrough when in said service mode.

2. A control system as set forth in claim 1, including control means, said actuating means including electric actuators, said control means operating said electric actuators to sequentially operate said ball valve between the plurality of operated positions, said electric actuators requiring electrical power only when said valve means are being moved between said operated positions.

3. A control system as set forth in claim 2, wherein said control means and said electric actuators are normally powered by a commercial source of electrical power, and said system provides battery backup power for operating said system during failures of said commercial source.

4. A control system as set forth in claim 3, wherein said electric actuators are rotary motors operated by low voltage direct current power, and said rotary motors are connected to the associated of said valve means by speed reducers.

5. A control system as set forth in claim 1, wherein said first substantially straight portion is aligned with said inlet port, and said second substantially straight portion is aligned with said outlet port.

6. A regenerating control for liquid conditioners which require a regenerating cycle including a backwash followed by a reagent rinse, followed by a fast rinse, and which operates in a service mode between regenerating cycles, comprising a housing having an inlet port, an outlet port, and a drain port, said housing providing a substantially uniform cross section flow path interconnecting said ports, said flow path providing a connection with said conditioner intermediate said ports, a first pair of ball valves in said flow path between said inlet port and said connection with said conditioner, a second pair of ball valves in said flow path between said outlet and drain ports and said connection with said conditioner, said ball valve operating to produce said regenerating cycle and said service mode, said ball valves each providing a through passage having a cross-sectional size substantially equal to said cross section of said flow path, said ball valves being operable in said service mode without restricting the flow of water through said flow path.

7. A regenerating control as set forth in claim 6, wherein said housing includes two housing halves cooperating to define said flow path, and seal means provide a fluidtight seal between said housing halves and between said housing halves and said ball valves.

8. A regenerating control as set forth in claim 7, wherein said seal means includes separate seal elements connected by mating hook and projection connections.

9. A regenerating control as set forth in claim 8, wherein said housing halves are joined along a substantially planar interface, and said ball valves rotate about axes perpendicular to said interface, and said seal means sealing between said ball valves and housing halves include hook and projection connections with seal means extending along said interface.

10. A regenerating control as set forth in claim 9, wherein said seal means sealing with said ball valves includes a seal element having a seal surface curved to mate with the surface of said ball valve and shaped to eliminate thin edge sections.

11. A regenerating control as set forth in claim 6, wherein said inlet and outlet ports are connected to a liquid supply and delivery system, and said liquid conditioner includes a tank containing a material for conditioning liquid, said housing halves being connected to said tank without requiring relative rotation therebetween permitting said housing halves to be connected to and removed from said tank while said housing halves are connected to said supply and delivery system.

12. A control system for liquid conditioners having a container of treatment material which must be periodically subjected to a reconditioning cycle and which operates to condition said liquid in a service mode between said reconditioning cycles, said control system comprising valve means movable to a plurality of positions for controlling said cycle and service mode, and electrically powered actuator means operable to move said valve means to said positions, said actuator means being electrically deenergized except when it is operating to move said valve means between said positions, low power drain electronic control means connected to said actuator means sequencing said valve means through said positions and controlling said reconditioning cycle and said service mode, said control means and said actuator means normally operating on low voltage direct current from a primary power source, and a backup battery power supply connected to said control means and actuator means capable of operating said control system for extended periods of time in the event of primary power failure.

13. A control system as set forth in claim 12, wherein said electronic control means initiates said reconditioning cycle at a specified time.

14. A control system as set forth in claim 12, wherein said electronic control means initiates said reconditioning cycle after a specified amount of liquid is conditioned.

15. A control system as set forth in claim 12, wherein said electronic control means inhibits said reconditioning cycle while an alternate liquid conditioner is unavailable for service.

16. A control system as set forth in claim 12, including valve position sensing means, said position sensing means terminating actuator operation when said valve is in said one of said positions.

17. A control system as set forth in claim 16, wherein said electronic control means responds to a signal from said sensing means and deenergizes said actuator when said electrical signal indicates said valve is in said one of said positions.

18. A control system as set forth in claim 16, wherein said electronic control means receives said electrical signal and provides an error indication if said position sensing means does not indicate said valve is in said one of said positions within a predetermined period of time.

* * * * *